Sept. 18, 1934.    E. G. GRINHAM ET AL    1,973,807
CHANGE SPEED GEAR MECHANISM
Filed Dec. 7, 1933
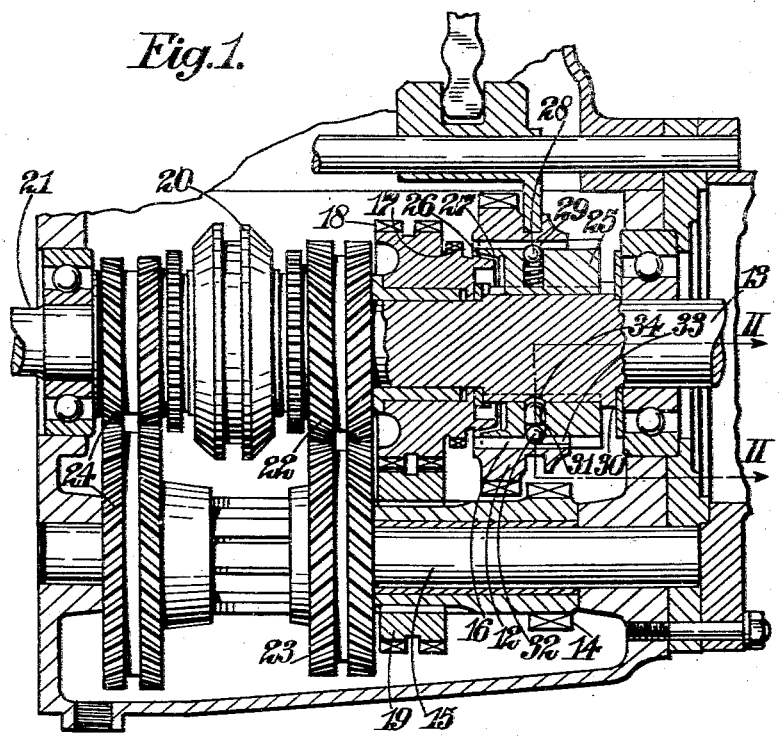
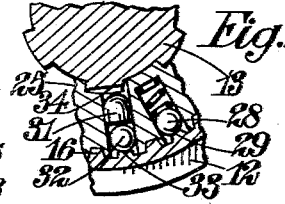
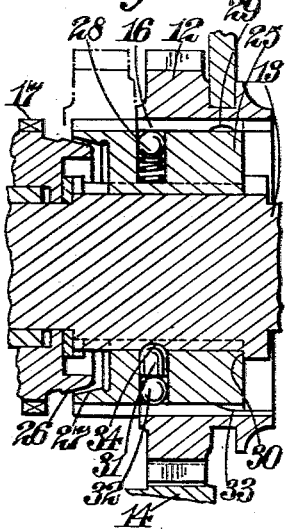
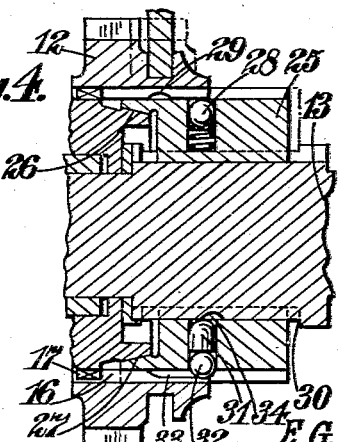
Inventors
E. G. Grinham
W. R. Turner
by Mawhinney & Mawhinney
Attorneys.

Patented Sept. 18, 1934

1,973,807

UNITED STATES PATENT OFFICE

1,973,807

CHANGE SPEED GEAR MECHANISM

Edward George Grinham and Walter Raymond Turner, Coventry, England, assignors of one-third to The Standard Motor Company Limited, Coventry, England Application December 7, 1933, Serial No. 701,388
In Great Britain June 10, 1933

5 Claims. (Cl. 74—339)

This invention relates to change-speed gear mechanism, of the kind including a member which is slidable from a neutral position in opposite directions selectively to mesh two sets of dogs or other teeth for introducing different speeds—i. e., one of the speed ratios or the direct drive—the said member having a frictional resilient connection with a slidable friction clutch element through which the latter will be moved, by movement of the said member from the neutral position in one direction, to engage a co-acting friction clutch element, whereby to synchronize the speeds of the teeth of that set to be meshed by the movement of the said member in the said one direction. The said member may be a gear wheel the teeth of which will be meshed, by the movement of the gear wheel in the other direction, with those of another gear wheel, these teeth constituting one of the sets to be meshed, the said member preferably carrying dogs which co-operate with other dogs and constitute the set of teeth that is to be synchronized by the movement of the said member in the said one direction.

The main object of the invention is to provide for the control of the slidable friction clutch element in a very satisfactory manner.

According to the invention, a locking means is provided for holding the slidable friction clutch element against axial movement except when the said member is in the neutral position or has been moved in the said one direction. That is to say, the locking means is effective to lock the sliding clutch element against axial movement only when the said member has been slid from the neutral position in the said other direction.

The said member, particularly when it is a gear wheel carrying dog teeth, may be non-rotatably and slidably mounted upon the slidable friction clutch element, this being a sleeve slidable but non-rotatable upon a shaft. The locking means can take the form of a peg carried in a radial bore of the slidable clutch element and adapted to enter and be held in a recess of the shaft when the said member is moved from the neutral position in the said other direction, the said member having an internal groove into which the peg can emerge, to be clear of the recess in the shaft and thus free the slidable clutch element, when the said member is in the neutral position or has been moved therefrom in the said one direction.

In the accompanying drawing:—

Figure 1 is a part-sectional elevation of a four-speed gear mechanism having the first and second speed introduced by means adapted according to the invention, the gear mechanism being shown in the neutral position;

Figure 2 is a fragmentary cross section, to a larger scale, of the slidable gear and clutch sleeve of Figure 1, the section being taken on the line II—II thereof; and Figures 3 and 4 are fragmentary sectional views of the slidable gear and clutch sleeve of Figure 1, showing, respectively, the first speed and the second speed engaged. The chain lines in Figures 3 and 4 indicate the neutral position of the slidable gear.

Like numerals indicate like parts throughout the drawing.

In the construction shown, where the first speed or bottom gear is introduced by sliding a gear wheel 12 on the driven shaft 13 into mesh with a gear wheel 14 fixed on the layshaft 15, it is this slidable gear wheel 12 that constitutes the aforesaid member and in this case carries dog teeth 16, 16 which in one position of the said member can mesh with dog teeth 17, 17 on a hub portion of a gear wheel 18 free on the driven shaft and in permanent mesh with a gear wheel 19 fixed on the layshaft for the second speed. A so-called "synchro-mesh" feature of a known type is preferably associated both with the fourth speed or direct drive and with the third speed. In the arrangement illustrated the "synchro-mesh" mechanism for these speeds is concealed by the slidable collar 20. This when moved to the left (Figure 1) causes the drive to be transmitted direct from the driving shaft 21 to the driven shaft, and when moved to the right locks to the driven shaft the gear wheel 22, this being in constant mesh with the gear wheel 23 fast on the layshaft, while the latter is permanently connected with the driving shaft by the gear pair 24.

The slidable gear 12, instead of being directly splined on the driven shaft, is slidably splined on a slidable friction clutch element shown as a clutch sleeve 25 which in turn is slidably splined on the driven shaft. The clutch sleeve has a female surface 26 which in one position of the sleeve (Figure 4) frictionally engages a co-acting male surface 27 on the gear wheel 18. The slidable gear 12 and clutch sleeve 25 are biassed for axial movement in unison when the former is moved to the left by means of a number of radial spring-pressed balls 28, 28 in the clutch sleeve engaging recesses 29 (Figure 1) formed in the slidable gear wheel. These spring-pressed balls form a frictional resilient connection between the slidable gear wheel and the clutch sleeve such that the initial movement of the gear wheel to the left (Figure 1) in the direction to cause engagement of the dog teeth 16 and 17 first slides the clutch sleeve surface 26 into frictional contact with the co-operating male surface 27, whereby the dog teeth are speeded up or down, as necessary, more or less to synchronism. Thereupon further movement of the gear wheel in the dog-engaging direction depresses the balls and allows the gear wheel to move relatively to the clutch sleeve to bring the synchronized dog teeth into mesh, as shown in Figure 4.

Conveniently the internal splines on the slidable gear form the dog teeth 16, 16 which engage those on the gear wheel 18, these latter dog teeth 17 being positioned axially between the main teeth of this gear and the male friction surface 27 as shown.

Movement of the sliding gear 12 in the other direction towards the neutral position allows the balls 28 again to enter the recesses 29 in the sliding gear, the frictional contact of the balls in the recesses being sufficient to effect withdrawal of the clutch sleeve from the co-acting male surface 27 if the clutch sleeve should stick until the slidable gear 12 were nearly returned to the neutral position. Movement of the clutch sleeve to the right beyond the neutral position is prevented by its engagement with the shoulder 30 fast on the shaft.

A number of pegs, here shown in the form of co-axial stem parts 31 and balls 32, is arranged in radial bores of the clutch sleeve. These can extend into grooves 33 in the gear wheel 12 when the latter is in the neutral position or has been slid therefrom to the left (Figures 1 and 4). When the gear wheel and clutch sleeve are both in the neutral position (Figure 1) these pegs can also extend into recesses 34 in the driven shaft. When the gear wheel 12 is moved to the right from the neutral position for introducing first speed (Figure 3), the pegs are forced into and held in these recesses 34, thus positively locking the clutch sleeve against axial movement with respect to the shaft. This is necessary to hold the surfaces 26, 27 out of engagement while the gear wheel 12 is being moved out of mesh with the gear wheel 14 towards the neutral position.

By means of the invention it is possible to provide a very satisfactory four-speed gear-box where top, third and second speeds can all be introduced on "synchro-mesh" principles, bottom gear being obtained by means of a sliding member, shown in the drawing in the form of a sliding gear wheel, without the use of any synchro-mesh feature, as a change down to this gear while the car is moving is, in practice, seldom necessary.

What we claim as our invention and desire to secure by Letters Patent of the United States is:—

1. A change-speed gear mechanism including a member having two sets of teeth which are slidable from a neutral position in opposite directions, other sets of teeth on other gear elements which can be selectively meshed with those of said member for introducing different speeds by the sliding of said member, a slidable friction clutch element, said member having a frictional resilient connection with said slidable friction clutch element through which this latter will be moved by movement of said member from the neutral position in one direction, a co-acting friction clutch element which is engaged by said slidable friction clutch element when this latter is moved from the neutral position, said co-acting friction clutch element being at all times movable with one of the sets of said other sets of teeth whereby to synchronize the speeds of one set of said teeth to be meshed, and locking means, for holding said slidable friction clutch element against axial movement, said locking means being ineffective when said member is in the neutral position or has been moved therefrom in said one direction.

2. A change-speed gear mechanism including a member having two sets of teeth slidable from a neutral position in opposite directions, other sets of teeth on other gear elements which can be selectively meshed with those of said member by the sliding of said member for introducing different speeds, a shaft, a friction clutch element non-rotatably slidable on said shaft said member being non-rotatably slidable upon said friction clutch element, a cooperating friction clutch element associated with one of said other gear elements, whereby to synchronize the speeds of the teeth to be meshed on said member and said other gear element when said member is moved in one direction, said member and slidable friction clutch element having a resilient friction interconnection whereby movement of said member from the neutral position in said one direction will cause the appropriate movement of said slidable friction clutch element, and a locking means for holding said slidable friction clutch element stationary on said shaft, said locking means co-operating with said member to be effective only when the latter has been moved from the neutral position in the other direction.

3. A four-speed gear-box including a driving shaft, a driven shaft, a lay-shaft driven from the driving shaft, a gear on the driven shaft having dog teeth on it, said gear being slidable in one direction to mesh with another gear on the layshaft to provide first speed and in the other direction to carry said dog teeth into mesh with dog teeth on a free gear on said driven shaft for use in the second speed drive, a clutch sleeve splined on said driven shaft, said slidable gear being splined on said clutch sleeve, cooperating friction surfaces on said free gear and clutch sleeve, spring-pressed balls in said clutch sleeve engaging internal recesses in said sliding gear (in the neutral position) whereby movement of said sliding gear towards the second speed position first engages said friction surfaces thus to synchronize said dog teeth prior to their being meshed, a stop on said driven shaft to prevent movement from the neutral position of said clutch sleeve in the other direction, and pegs extending through said clutch sleeve into recesses in said shaft, and held in that position by said slidable gear when it is in the first speed position or between the first speed position and the neutral position so that said clutch sleeve cannot be slid on said shaft when said slidable gear is being moved from the first speed to the neutral position, said slidable gear having internal grooves in which said pegs can lie to be clear of said recesses in said shaft when said slidable gear is in the neutral or the second speed position or between these two positions.

4. In a gear-box, a shaft, a clutch sleeve slidably splined on said shaft, a stop for limiting movement of said clutch sleeve in one direction, a member slidably splined on said clutch sleeve, a resilient friction connection between said clutch sleeve and member and a radial peg in said clutch sleeve, said member being adapted to co-operate with said peg so that when said member is moved from the neutral position in one direction the peg is held by said member in a recess in said shaft, thus to lock said clutch sleeve to said shaft, and when moved in the other direction the peg extends into a groove in said member so as to be clear of said recess in said shaft.

5. In a gear-box, a shaft, a free gear on said shaft, said free gear having a friction surface and dog teeth, a clutch sleeve non-rotatably mounted on said shaft and slidable to frictionally engage said friction surface, a slidable gear non-rotatably mounted on said clutch sleeve, a second shaft, a gear fast on said second shaft, said slidable gear being adapted in one position to mesh with said fast gear, and said slidable gear having dog teeth adapted in another position to mesh with the dog teeth on said free gear, and a resilient friction connection between said slidable gear and clutch sleeve.

EDWARD GEORGE GRINHAM.
WALTER RAYMOND TURNER.